US012715077B2

(12) United States Patent
Takiguchi

(10) Patent No.: US 12,715,077 B2
(45) Date of Patent: Aug. 25, 2026

(54) TOOL STAND

(71) Applicant: DMG MORI CO., LTD., Nara (JP)

(72) Inventor: Yoshihiro Takiguchi, Nara (JP)

(73) Assignee: DMG MORI CO., LTD., Nara (JP)

( * ) Notice: Subject to any disclaimer, the term of this patent is extended or adjusted under 35 U.S.C. 154(b) by 587 days.

(21) Appl. No.: 18/108,242

(22) Filed: Feb. 10, 2023

(65) Prior Publication Data

US 2023/0256552 A1 Aug. 17, 2023

(30) Foreign Application Priority Data

Feb. 14, 2022 (JP) ................................ 2022-020152

(51) Int. Cl.
*B23Q 3/155* (2006.01)

(52) U.S. Cl.
CPC ..... *B23Q 3/15546* (2013.01); *B23Q 3/15526* (2013.01); *B23Q 2003/15532* (2016.11)

(58) Field of Classification Search
CPC ........... B23Q 3/15546; B23Q 3/15526; B23Q 2003/15532
See application file for complete search history.

(56) References Cited

U.S. PATENT DOCUMENTS 7,965,190 B2 * 6/2011 Maloney .............. G08B 13/196 340/568.1
10,740,994 B2 * 8/2020 Phillips .................... G07C 9/28

FOREIGN PATENT DOCUMENTS

EP 3895849 A1 10/2021
JP S59118319 A 7/1984
JP H0366550 A 3/1991
JP H03166030 A 7/1991

* cited by examiner

*Primary Examiner* — Ryan J. Walters
(74) *Attorney, Agent, or Firm* — IP Business Solutions, LLC

(57) ABSTRACT

A tool stand includes a first tool holder for allowing a tool to be placed thereon, a second tool holder for allowing a tool to be placed thereon, an accepting portion for accepting an instruction to read tool information on a tool placed on the first tool holder or the second tool holder, and a transmitter for (i) transmitting first tool information on a first tool placed on the first tool holder to a storage portion for storing therein tool information when the first tool information is read, and (ii) transmitting an instruction to delete second tool information on a second tool placed on the second tool holder when the second tool information is read.

2 Claims, 12 Drawing Sheets

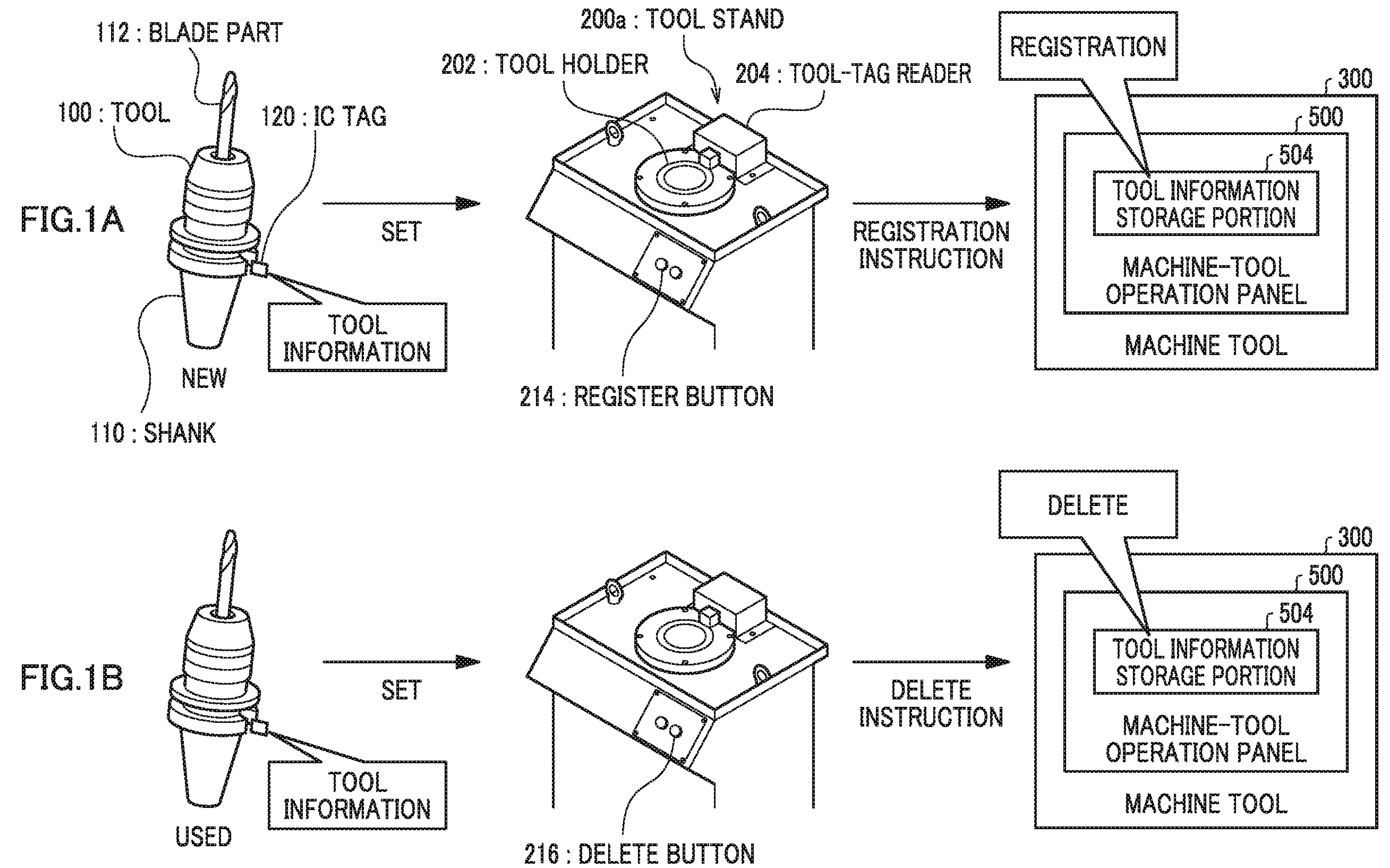
FIG.1A
112 : BLADE PART
100 : TOOL
120 : IC TAG
NEW
110 : SHANK
TOOL INFORMATION
SET
200a : TOOL STAND
202 : TOOL HOLDER
204 : TOOL-TAG READER
214 : REGISTER BUTTON
REGISTRATION INSTRUCTION
REGISTRATION
300
500
504
TOOL INFORMATION STORAGE PORTION
MACHINE-TOOL OPERATION PANEL
MACHINE TOOL
FIG.1B
USED
TOOL INFORMATION
SET
216 : DELETE BUTTON
DELETE INSTRUCTION
DELETE
300
500
504
TOOL INFORMATION STORAGE PORTION
MACHINE-TOOL OPERATION PANEL
MACHINE TOOL

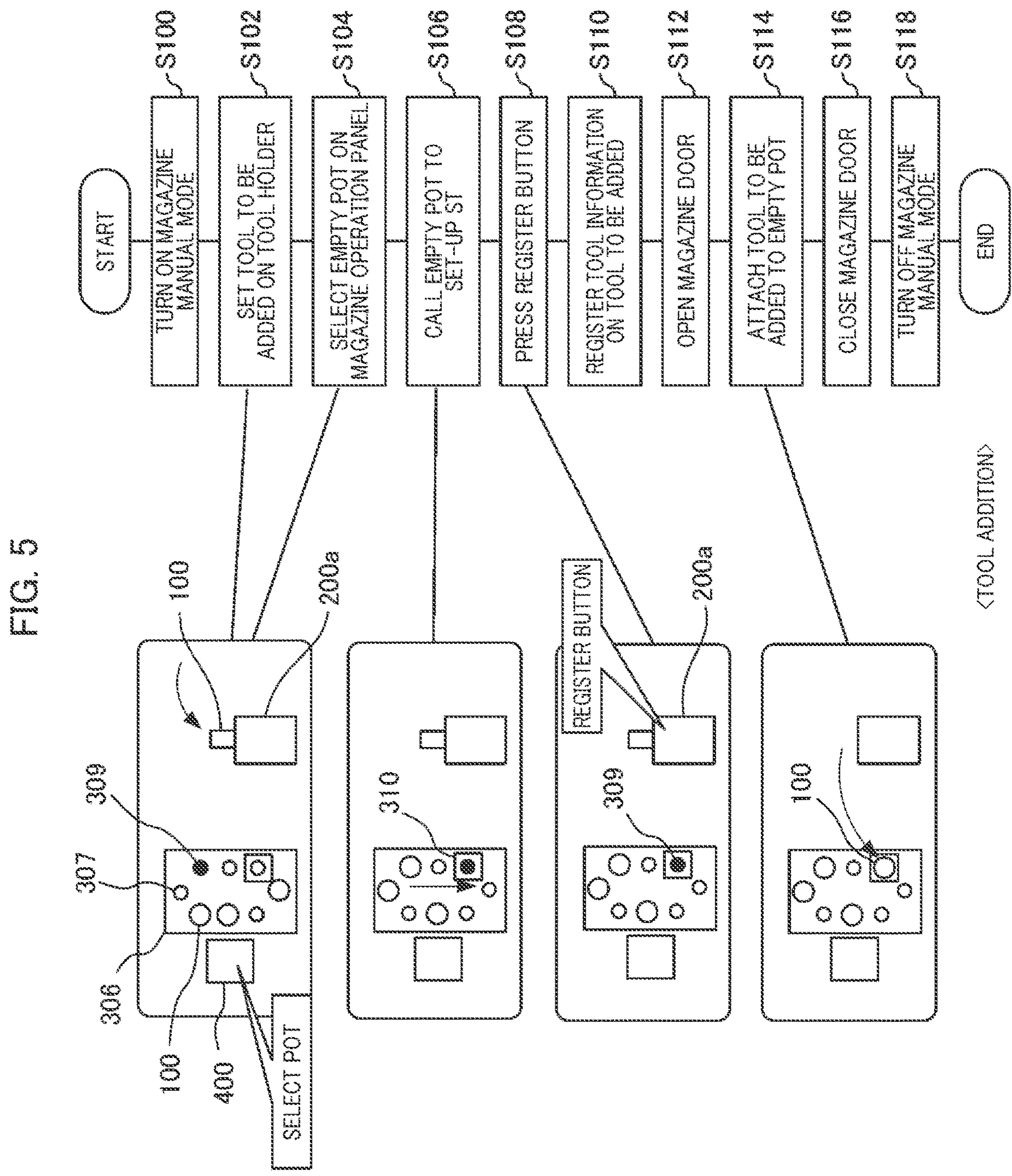
FIG. 5
START
TURN ON MAGAZINE MANUAL MODE
S100
SET TOOL TO BE ADDED ON TOOL HOLDER
S102
SELECT EMPTY POT ON MAGAZINE OPERATION PANEL
S104
CALL EMPTY POT TO SET-UP ST
S106
PRESS REGISTER BUTTON
S108
REGISTER TOOL INFORMATION ON TOOL TO BE ADDED
S110
OPEN MAGAZINE DOOR
S112
ATTACH TOOL TO BE ADDED TO EMPTY POT
S114
CLOSE MAGAZINE DOOR
S116
TURN OFF MAGAZINE MANUAL MODE
S118
END
100
200a
309
307
306
100
400
SELECT POT
310
REGISTER BUTTON
200a
309
100
<TOOL ADDITION>

START
TURN ON MAGAZINE MANUAL MODE
S200
SELECT POT FOR TOOL CHANGE ON MAGAZINE OPERATION PANEL
S202
CALL POT FOR TOOL CHANGE TO SET-UP ST
S204
OPEN MAGAZINE DOOR
S206
DETACH USED TOOL FROM POT
S208
CLOSE MAGAZINE DOOR
S210
SET USED TOOL ON TOOL HOLDER
S212
PRESS DELETE BUTTON
S214
DELETE TOOL INFORMATION ON USED TOOL
S216
TO S218
100
311
307
306
400
SELECT POT
200a
310
100
DELETE BUTTON
<TOOL CHANGE>

FIG. 7

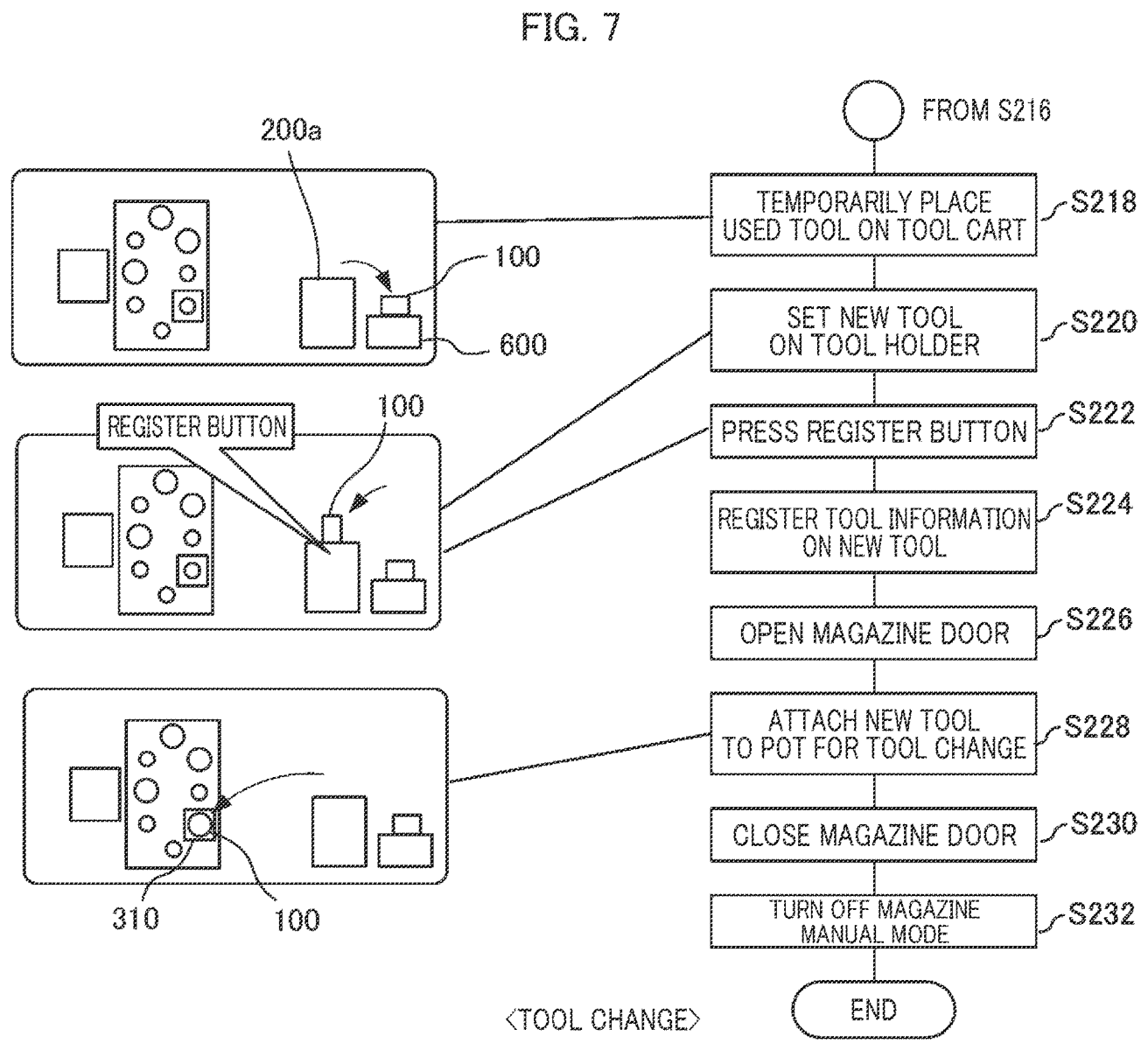

FROM S216

S218 TEMPORARILY PLACE USED TOOL ON TOOL CART

S220 SET NEW TOOL ON TOOL HOLDER

S222 PRESS REGISTER BUTTON

S224 REGISTER TOOL INFORMATION ON NEW TOOL

S226 OPEN MAGAZINE DOOR

S228 ATTACH NEW TOOL TO POT FOR TOOL CHANGE

S230 CLOSE MAGAZINE DOOR

S232 TURN OFF MAGAZINE MANUAL MODE

END

200a

100

600

100

REGISTER BUTTON

100

310

<TOOL CHANGE>

<TOOL REMOVAL>

START
TURN ON MAGAZINE MANUAL MODE
S400
SET FIRST TOOL TO BE ADDED ON FIRST TOOL HOLDER
S402
PRESS CALL BUTTON
S404
CALL EMPTY POT TO SET-UP ST
S406
PRESS REGISTER BUTTON
S408
REGISTER FIRST TOOL INFORMATION ON FIRST TOOL
S410
OPEN MAGAZINE DOOR
S412
ATTACH TOOL TO EMPTY POT
S414
CLOSE MAGAZINE DOOR
S416
TURN OFF MAGAZINE MANUAL MODE
S418
END
〈TOOL ADDITION〉
101
200b
309
307
306
100
400
CALL BUTTON
310
REGISTER BUTTON
200b
309
101

FROM S518
PRESS REGISTER BUTTON
S520
REGISTER FIRST TOOL INFORMATION ON FIRST TOOL
S522
OPEN MAGAZINE DOOR
S524
ATTACH FIRST TOOL TO POT FOR TOOL CHANGE
S526
CLOSE MAGAZINE DOOR
S528
TURN OFF MAGAZINE MANUAL MODE
S530
END
REGISTER BUTTON
101
101
310
<TOOL CHANGE>

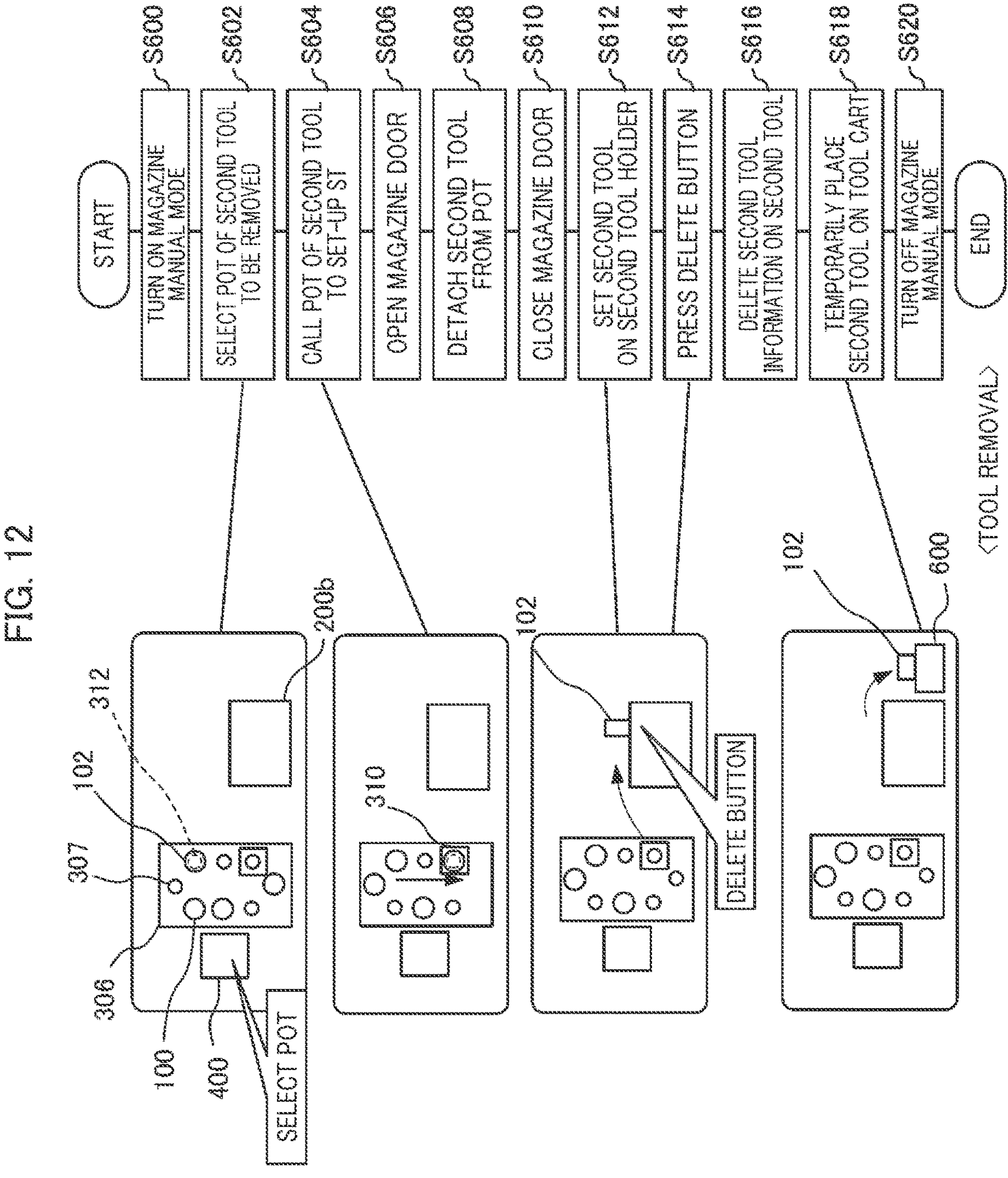
FIG. 12
START
TURN ON MAGAZINE MANUAL MODE
S600
SELECT POT OF SECOND TOOL TO BE REMOVED
S602
CALL POT OF SECOND TOOL TO SET-UP ST
S604
OPEN MAGAZINE DOOR
S606
DETACH SECOND TOOL FROM POT
S608
CLOSE MAGAZINE DOOR
S610
SET SECOND TOOL ON SECOND TOOL HOLDER
S612
PRESS DELETE BUTTON
S614
DELETE SECOND TOOL INFORMATION ON SECOND TOOL
S616
TEMPORARILY PLACE SECOND TOOL ON TOOL CART
S618
TURN OFF MAGAZINE MANUAL MODE
S620
END
<TOOL REMOVAL>
312
102
307
306
100
400
200b
SELECT POT
310
102
DELETE BUTTON
102
600

TOOL STAND

BACKGROUND OF INVENTION

1. Field

The present invention relates to a technology for managing tool information on tools for machine tools.

2. Description of Related Art

A tool magazine of a machine tool accommodates a number of tools. For example, about 200 tools are accommodated in some cases. Tool information on these tools is managed by an operation panel of the machine tool.

The tools accommodated in the tool magazine are attached to a machining portion of the machine tool by a tool changing device and used. A tool repeatedly used is worn and may be broken. Therefore, as tool maintenance, it is necessary to change a tool accommodated in the tool magazine with a new tool in order to prevent troubles or solve troubles later. That is, a worker detaches a used tool from the tool magazine and changes it with a new tool.

In such tool change, it is necessary to perform an operation that deletes tool information on the used tool managed by the operation panel of the machine tool and registers tool information on the new tool. It is troublesome for the worker to manually perform the update of tool information associated with the tool change described above.

Related Art List

Patent Literature 1: JP S59-118319 A

Patent Literature 1 teaches a technique that "a label including a barcode indicating a tool type and a tool number is created and attached to a tool holder, and when a user loads a tool, the user inputs the barcode on the label of that tool holder to a computer with a barcode reader, and the computer automatically sets a magazine number of a magazine on which the tool is loaded" (see the upper right column on Page 2). This technique enables automatic input of tool information on a tool to be added to the tool magazine.

FIG. 1 of Patent Literature 1 illustrates a barcode scanner 7 connected to a barcode reader 6. In FIG. 1, the barcode scanner 7 appears to be coupled to the barcode reader 6 with a spiral cable. Further, the lower left column on Page 3 provides a description that "107: the barcode of the label 31 attached to the tool holder (41 in FIG. 4) is scanned with the barcode scanner 7 to be input to the computer 1". However, there is no description as to where to place the "tool". Therefore, a work is supposed to be necessary in which the worker prepares a temporary storage such as a tool cart, temporarily places the tool in the temporary storage, and holds the "barcode scanner 7" in hand and brings it closer to the barcode of the placed tool.

The work of preparing the temporary storage, temporarily placing the tool, and bringing the "barcode scanner 7" held in hand closer to the tool to read the barcode in this manner is troublesome. In addition, there is no reference to a case of changing a used tool with a new tool.

SUMMARY OF INVENTION

Accordingly, the present invention provides devices (tool stand) and the like according to the claims.

According to the present invention, it is possible to provide a tool stand that makes an operation associated with management of tool information on tools taken in and out from a tool magazine easier.

BRIEF DESCRIPTION OF DRAWINGS

FIG. 1A is a diagram illustrating an outline of registration of tool information using a tool stand, and FIG. 1B is a diagram illustrating an outline of deletion of tool information using the tool stand;

FIG. 5 is a flowchart of works and operations when a tool is attached using a 1-holder type tool stand (in tool addition);

FIG. 7 is a flowchart of works and operations when the tool is changed using the 1-holder type tool stand (in tool change);

FIG. 12 is a flowchart of works and operations when the tool is detached using the 2-holder type tool stand (in tool removal).

DETAILED DESCRIPTION

Figure 2:
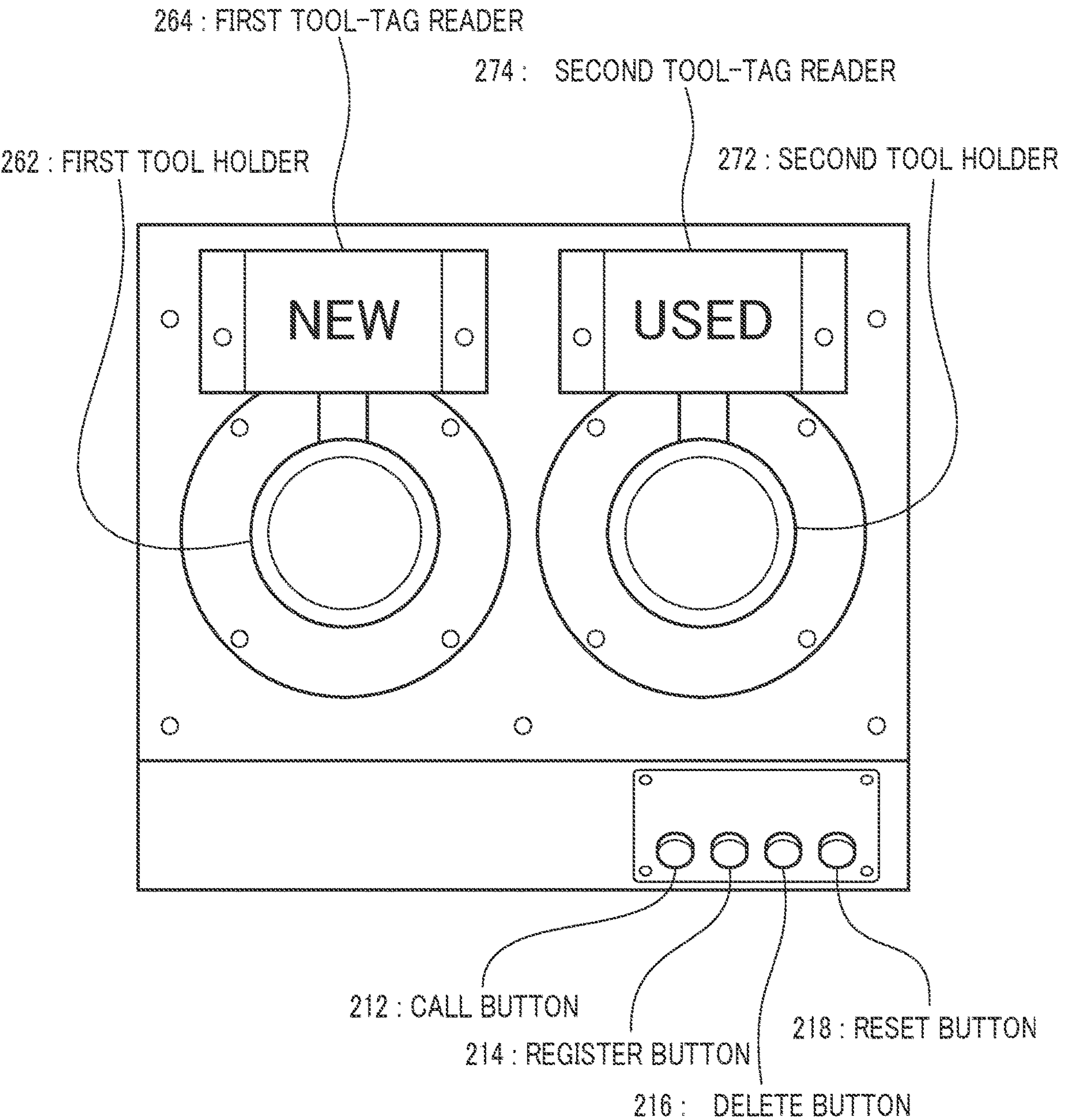
FIG. 2 is a top view of a 2-holder type tool stand 200*b;*

FIG. 1A is a diagram illustrating an outline of registration of tool information using a tool stand 200*a*.

The tool stand 200*a* is illustrated in the center part of FIG. 1A. The tool stand 200*a* has a tool holder 202 that allows a tool to be placed thereon. As illustrated in FIG. 1A, a circular hole is formed by the tool holder 202 in the top surface of the tool stand 200*a*. Here, the 1-holder type tool stand 200*a* is described as a reference example. A 2-holder type tool stand 200*b* according to the present embodiment will be described later with reference to FIG. 2.

A tool 100 is illustrated in the left part of FIG. 1A. In the illustrated orientation, a blade part 112 for cutting a workpiece is located in an upper part of the tool 100, and a shank 110 to be attached to an attachment portion of a machine tool is located in a lower part of the tool 100. The attachment portion of the machine tool is, for example, a spindle of a machining center or a turret of a turning center.

Further, an IC (Integrated Circuit) tag 120 is attached to the tool 100. The IC tag 120 has a semiconductor memory in which tool information on that tool 100 is stored, and transmits the tool information in response to radio waves from an external tag reader. Examples of the tool information include a tool ID, a tool number, a life set value, a tool name, a tool shape (length and diameter), and an ATC (Automatic Tool Changer) speed. The IC tag 120 is one type of RFID (Radio frequency identification) tags.

When adding the tool 100 to a tool magazine of the machine tool, a worker sets the tool 100 to be added on the tool holder 202. More specifically, the tool 100 is placed in such a manner that the shank 110 is inserted into the circular hole of the tool holder 202. The tool holder 202 supports and holds the tool 100 in such a manner that the axis of the tool 100 is vertical. The worker then presses a register button 214 on the front side of the tool stand 200*a*. The position where the register button 214 is provided is not limited to the front side, and may be any position.

A tool-tag reader 204 is provided on the back side of the tool holder 202. When the register button 214 is pressed, the tool-tag reader 204 reads the tool information from the IC tag 120 of the tool 100 placed on the tool holder 202. The tool stand 200*a* then transmits a registration instruction including the read tool information to a machine-tool operation panel 500 (see FIG. 3) of a machine tool 300. The position of the tool-tag reader 204 is not limited to the position on the back side of the tool holder 202, and may be any position.

The machine-tool operation panel 500 has a tool information storage portion 504 that stores therein tool information on tools accommodated in the tool magazine. The machine-tool operation panel 500 registers the tool information included in the registration instruction received from the tool stand 200*a* in the tool information storage portion 504.

Since the tool information on the tool 100 to be added is automatically registered in the tool information storage portion 504 of the machine-tool operation panel 500 in this manner, an operation of inputting the tool information on the machine-tool operation panel 500 by the worker is not necessary.

FIG. 1B is a diagram illustrating an outline of deletion of tool information using the tool stand 200*a*.

When the tool 100 is detached from a tool magazine of a machine tool, a worker sets the detached tool 100 on the tool holder 202. The worker then presses a delete button 216 located on the front side of the tool stand 200*a*. The position where the delete button 216 is provided is not limited to the front side, and may be any position.

When the delete button 216 is pressed, the tool-tag reader 204 reads tool information from the IC tag 120 of the tool 100 placed on the tool holder 202. The tool stand 200*a* then transmits a delete instruction including the read tool information to the machine-tool operation panel 500 (see FIG. 3) of the machine tool 300.

The machine-tool operation panel 500 deletes tool information that is the same as the tool information included in the delete instruction received from the tool stand 200*a*, from the tool information storage portion 504.

Since the tool information on the detached tool 100 is automatically deleted from the tool information storage portion 504 of the machine-tool operation panel 500 in this manner, an operation of deleting the tool information on the machine-tool operation panel 500 by the worker is not necessary.

However, as for the 1-holder type tool stand 200*a*, a work of changing the tool 100 accommodated in the tool magazine with another tool 100 is difficult to perform because both the tool 100 taken out and the tool 100 that is to be newly accommodated cannot be placed at the same time.

FIG. 2 is a top view of the 2-holder type tool stand 200*b*.

The tool stand 200*b* according to the present embodiment has two holders. The tool 100 to be added is set on a first tool holder 262. The detached tool 100 is set on a second tool holder 272. Accordingly, both the tool 100 to be added and the detached tool 100 can be placed at the same time. As described above, the tool stand 200*b* has the first tool holder 262 on which the tool 100 can be placed and the second tool holder 272 on which the tool 100 can be placed.

A first tool-tag reader 264 is provided on the back side of the first tool holder 262. The first tool-tag reader 264 reads tool information from the IC tag 120 of the tool 100 placed on the first tool holder 262. A second tool-tag reader 274 is provided on the back side of the second tool holder 272. The second tool-tag reader 274 reads tool information from the IC tag 120 of the tool 100 placed on the second tool holder 272.

A call button 212, the register button 214, the delete button 216, and a reset button 218 are provided on the front side of the 2-holder type tool stand 200*b*. The position where each button is provided is not limited to the front side, and may be any position.

The call button 212 accepts an instruction to call a pot of a tool magazine (hereinafter, a "pot call instruction"). The register button 214 accepts an instruction to register tool information (hereinafter, a "registration instruction"). The delete button 216 accepts an instruction to delete tool information (hereinafter, a "delete instruction"). The reset button 218 accepts an instruction to reset the state of the tool stand 200*b*. When an error occurs during an operation of a magazine operation panel 400, the buttons blink. When a worker presses the reset button 218 in this state, blinking of the buttons ends. Details of an operation of the 2-holder type tool stand 200*b* will be described later.

Figure 3:
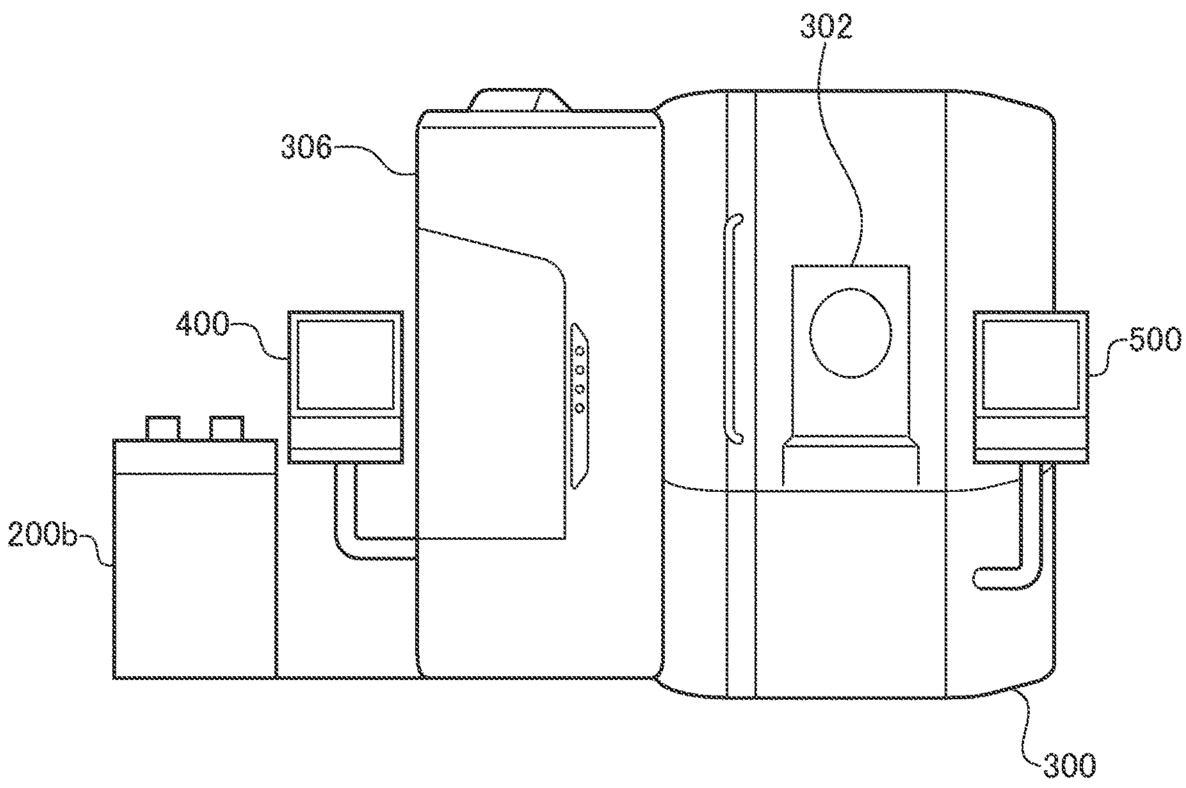
FIG. 3 is an external view of a tool stand 200*b* and a machine tool 300.

FIG. 3 is an external view of the tool stand 200*b* and the machine tool 300.

The machine tool 300 is, for example, a turning center, a machining center, or a combined machine. A machining chamber is located on the back side of the door of the machine tool 300, in which a machining portion 302 for machining a workpiece is installed. The machine-tool operation panel 500 is installed on a side surface of the machine tool 300.

The machine tool 300 is provided with a tool magazine 306. In this example, the tool magazine 306 is located on the left side of the machining chamber. The magazine operation panel 400 is installed on a side surface close to the tool magazine 306.

The tool stand 200*b* is placed next to the tool magazine 306, for example. However, the tool stand 200*b* may be integrated with the machine tool 300.

Figure 4:
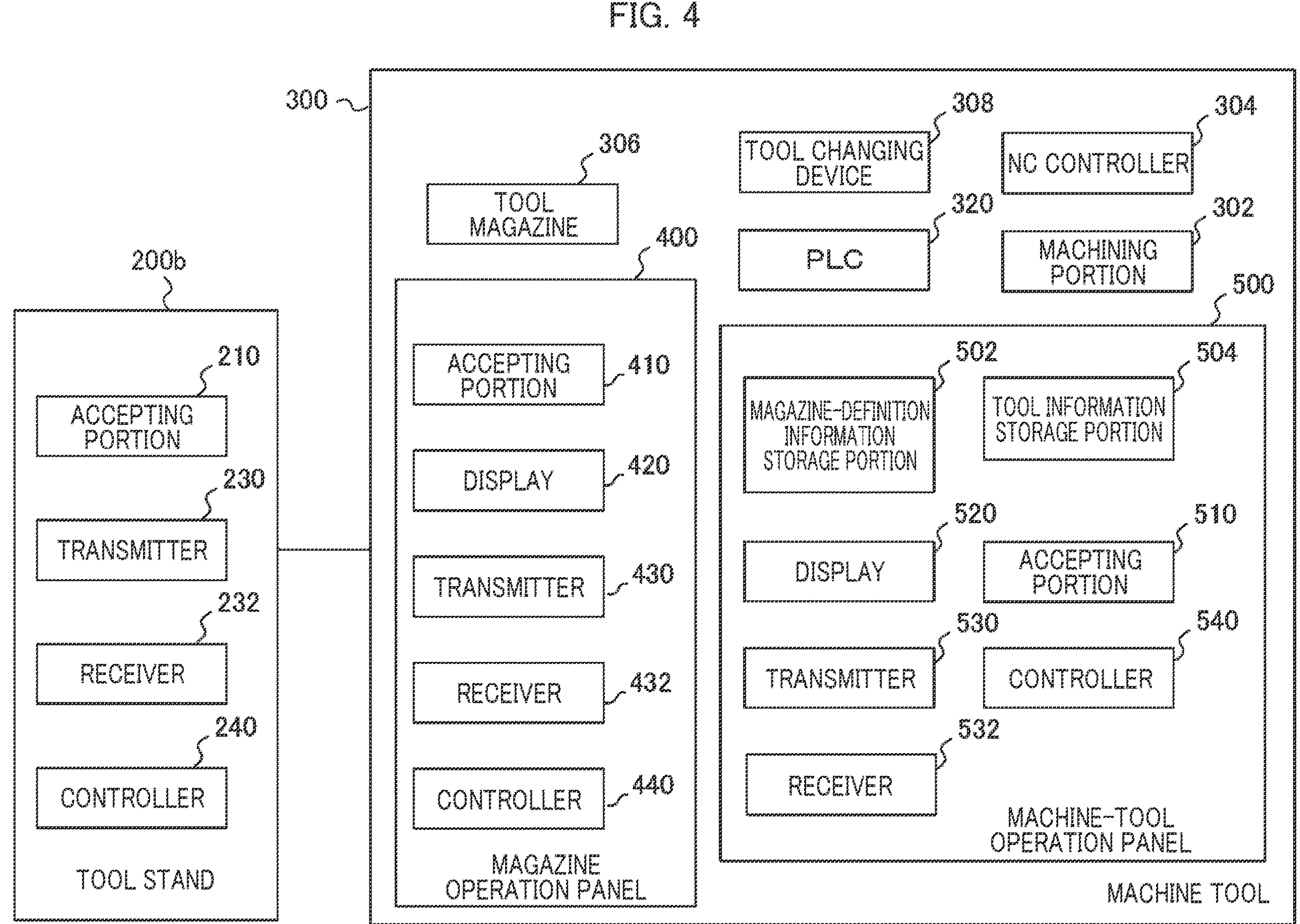
FIG. 4 is a block diagram of the tool stand 200*b* and the machine tool 300.

FIG. 4 is a block diagram of the tool stand 200*b* and the machine tool 300.

The machine tool 300 includes the machining portion 302, an NC (Numerical Control) controller 304, a PLC (programmable logic controller) 320, the tool magazine 306, a tool changing device 308, the machine-tool operation panel 500, and the magazine operation panel 400.

The NC controller 304 controls a servo motor of the machining portion 302 and the like in accordance with a program complying with standard specifications of numerical control. This program is called an NC program. NC commands to cause the machining portion 302, and the tool magazine 306, for example, to carry out predetermined functions are described in the NC program.

The PLC 320 controls tool change by the tool changing device 308 and release of a coolant from the machining chamber, for example. The PLC 320 in the present embodiment performs processes that relay various instructions sent from the tool stand 200*b* to the machine-tool operation panel 500. However, various instructions may be directly transferred from the tool stand 200*b* to the machine-tool operation panel 500. Details of transfer of instructions will be described later.

The machine-tool operation panel 500 includes a magazine-definition information storage portion 502, the tool information storage portion 504, an accepting portion 510, a display 520, a transmitter 530, a receiver 532, and a controller 540.

The magazine-definition information storage portion 502 stores therein magazine definition information. The magazine definition information defines, for each pot, information on a pot adjacent to that pot and the maximum diameter and the maximum length of a tool that can be accommodated in that pot, for example.

The tool information storage portion 504 stores therein tool information on each tool 100 accommodated in the tool magazine 306 in such a manner that the tool information corresponds to a pot number. Examples of the tool information include a tool ID, a tool number, a life set value, a tool name, a tool shape (length and diameter), and an ATC speed, as described above.

Tool IDs are information for identifying individuals of tools. That is, even if tools are of the same model, different IDs are assigned to different individuals, respectively. Tool numbers are also different between different individuals of tools. The use of the tool numbers depends on operation and is freely set. For example, a tool number may be used when a tool is specified in an NC program. Tool names are different depending on tool models. That is, the tool names are information for identifying the tool models. A plurality of tools having the same tool name are of the same model and are therefore changeable with each other for the same use. For example, in a case of changing a used tool with a tool of the same model, the new tool and the used tool are the same in tool name but are different in tool ID and tool number. A life set value is referred to as a condition for determination of a timing of tool change for maintenance. For an empty pot, there is no tool information corresponding to its pot number. Instead, information indicating no tool is stored.

The accepting portion 510 accepts user operations (e.g., various instructions). The display 520 displays various types of information. The transmitter 530 transmits various types of information to the magazine operation panel 400, the tool stand 200*b* (also the tool stand 200*a* hereafter), the PLC 320, and the like. The receiver 532 receives various types of information from the magazine operation panel 400, the tool stand 200*b*, the PLC 320, and the like. The controller 540 executes various types of control.

The magazine operation panel 400 includes an accepting portion 410, a display 420, a transmitter 430, a receiver 432, and a controller 440.

The accepting portion 410 accepts user operations (e.g., various instructions). The display 420 displays various types of information. The transmitter 430 transmits various types of information to the machine-tool operation panel 500, the tool stand 200*b*, the PLC 320, and the like. The receiver 432 receives various types of information from the machine-tool operation panel 500, the tool stand 200*b*, the PLC 320, and the like. The controller 440 executes various types of control.

The tool stand 200*b* is connected to the machine tool 300 and can communicate with the machine tool 300. The tool stand 200*b* includes an accepting portion 210, a transmitter 230, a receiver 232, and a controller 240.

The accepting portion 210 accepts user operations (e.g., various instructions). The transmitter 230 transmits various types of information to the machine-tool operation panel 500, the magazine operation panel 400, the PLC 320, and the like. The receiver 232 receives various types of information from the machine-tool operation panel 500, the magazine operation panel 400, the PLC 320, and the like. The controller 240 executes various types of control.

Works and operations involved in addition of the tool 100, change of the tool 100, and removal of the tool 100 in a case of the 1-holder type tool stand 200*a* are described as a reference example for comparison, prior to the description of details of the 2-holder type tool stand 200*b* according to the present embodiment.

FIG. 5 is a flowchart of works and operations when the tool 100 is attached using the 1-holder type tool stand 200*a* (in tool addition).

For making it easier to understand the flow of works illustrated on the right side, work statuses are schematically illustrated on the left side. An example of a chain magazine is described here, in which the number of pots in the tool magazine 306 is assumed to be eight for simplicity. It is assumed that the pots rotate clockwise. A small circle in the tool magazine 306 represents an empty pot 307. A large circle represents the tool 100 fitted into a pot.

A worker operates the magazine operation panel 400 to turn on a magazine manual mode (S100). In the magazine manual mode, the tool magazine 306 can be operated manually. The worker sets the tool 100 to be added to the tool magazine 306 on the tool holder 202 of the tool stand 200*a* (S102). The worker operates the magazine operation panel 400 to select an empty pot 309 (S104). For making it easier to recognize the selected empty pot 309, this pot is illustrated with a black circle. With this operation, the empty pot 309 is called to a set-up station 310 (S106). A call of a pot performed here may be also referred to as "indexing of a pot".

The worker presses the register button 214 (S108). With this operation, tool information on the tool 100 to be added is registered in the tool information storage portion 504 of the machine-tool operation panel 500 (S110). The worker opens the door of the tool magazine 306 (hereinafter, the "magazine door") (S112). The worker attaches the tool 100 to be added, to the empty pot 309 called to the set-up station 310 (S114). The worker closes the magazine door (S116). The worker operates the magazine operation panel 400 to turn off the magazine manual mode (S118).

Figure 6:
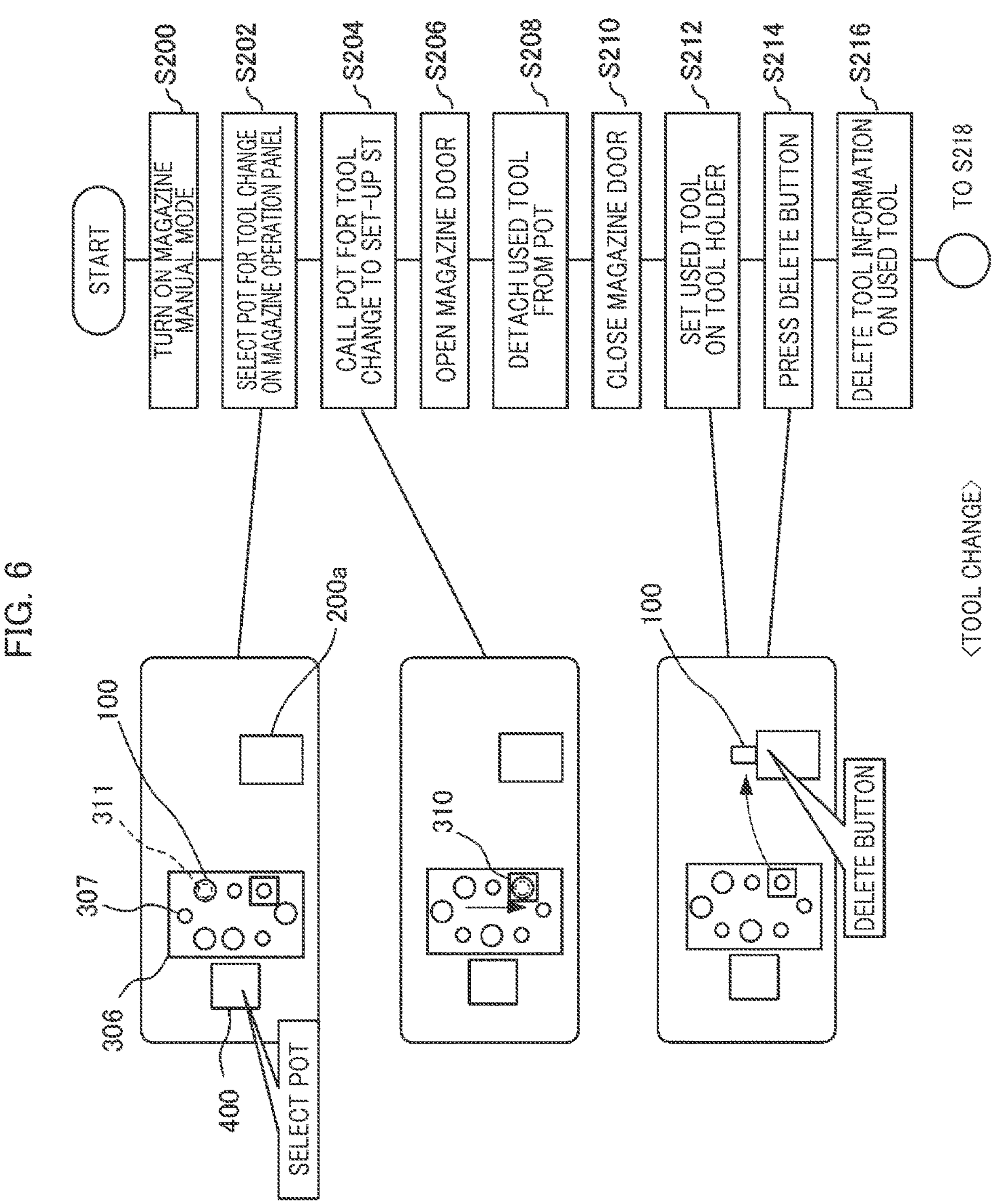
FIG. 6 is a flowchart of works and operations when the tool is changed using the 1-holder type tool stand (in tool change)

FIGS. 6 and 7 are flowcharts of works and operations when the tool 100 is changed using the 1-holder type tool stand 200*a* (in tool change).

A worker operates the magazine operation panel 400 to turn on a magazine manual mode (S200). The worker operates the magazine operation panel 400 to select a pot 311 for tool change (S202). The pot 311 for tool change is illustrated with a broken-line circle. The used tool 100 is fitted into the pot 311 for tool change. With this operation, the pot 311 for tool change is called to the set-up station 310 (S204). The worker opens the magazine door (S206). The worker detaches the used tool 100 from the pot 311 (S208). The worker then closes the magazine door (S210).

The worker sets the used tool 100 thus detached on the tool holder 202 (S212). The worker presses the delete button 216 (S214). With this operation, tool information on the used tool 100 that has already been registered in the tool information storage portion 504 of the machine-tool operation panel 500 is deleted (S216).

FIG. 7 is described next. The worker temporarily places the used tool 100 on a tool cart 600 (S218). The worker sets the new tool 100 on the tool holder 202 (S220). The worker then presses the register button 214 (S222). With this operation, tool information on the new tool 100 is registered in the tool information storage portion 504 of the machine-tool operation panel 500 (S224).

The worker opens the magazine door (S226). The worker attaches the new tool 100 to the pot 311 (S228). The worker closes the magazine door (S230). The worker then operates the magazine operation panel 400 to turn off the magazine manual mode (S232).

Figure 8:
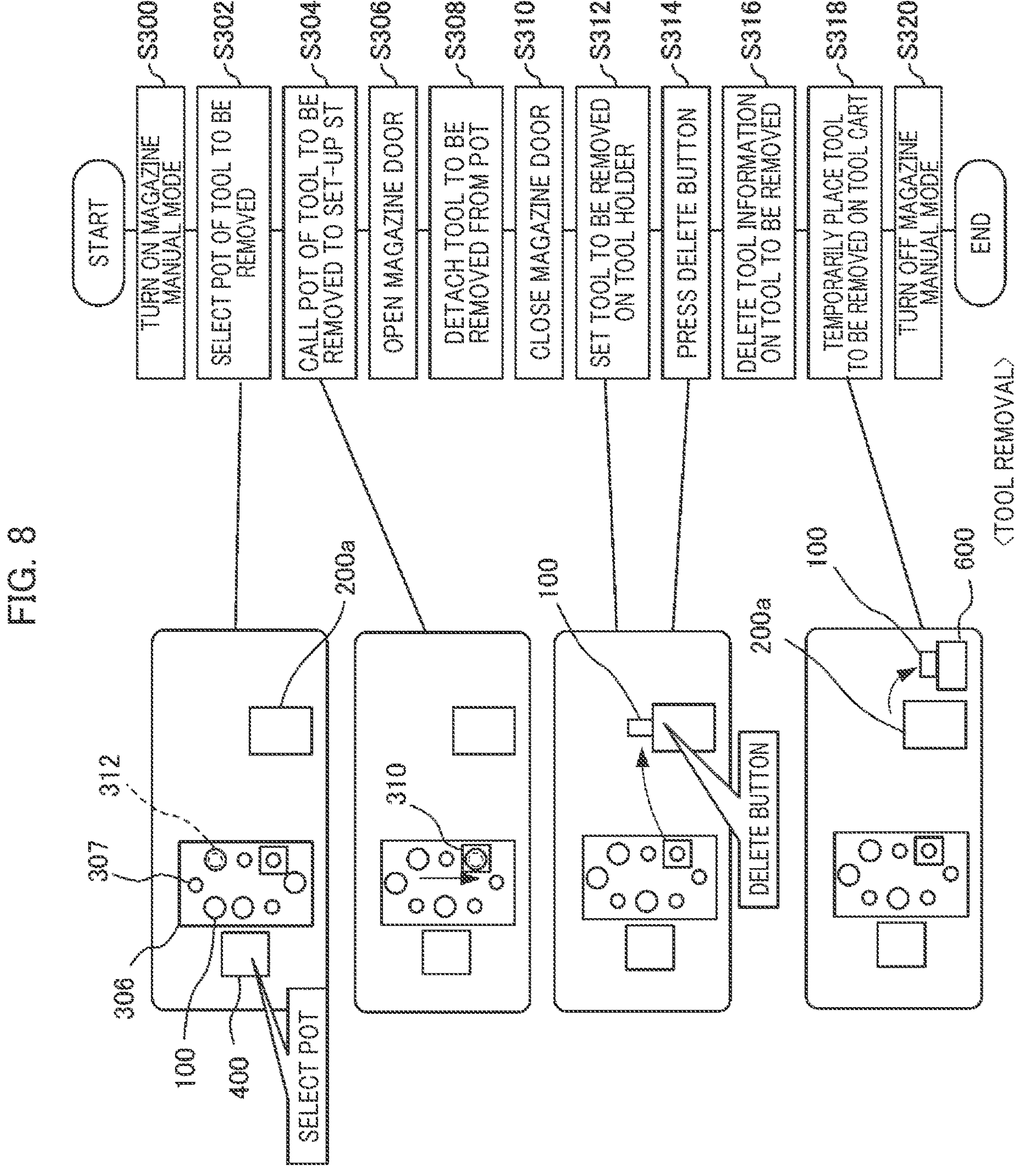
FIG. 8 is a flowchart of works and operations when the tool is detached using the 1-holder type tool stand (in tool removal)

FIG. 8 is a flowchart of works and operations when the tool 100 is detached using the 1-holder type tool stand 200*a* (in tool removal).

A worker operates the magazine operation panel 400 to turn on a magazine manual mode (S300). The worker operates the magazine operation panel 400 to select a pot 312 of the tool 100 to be removed (S302). The pot 312 of the tool 100 to be removed is illustrated with a broken-line circle. With this operation, the pot 312 of the tool 100 to be removed is called to the set-up station 310 (S304). The worker opens the magazine door (S306). The worker detaches the tool 100 to be removed, from the pot 312 (S308). The worker then closes the magazine door (S310).

The worker sets the tool 100 to be removed on the tool holder 202 of the tool stand 200*a* (S312). The worker presses the delete button 216 (S314). With this operation, tool information on the tool 100 to be removed, which has already been registered in the tool information storage portion 504 of the machine-tool operation panel 500, is deleted (S316).

The worker temporarily places the tool to be removed on the tool cart 600 (S318). The worker then operates the magazine operation panel 400 to turn off the magazine manual mode (S320).

Next, works and operations involved in addition of the tool 100, change of the tool 100, and removal of the tool 100 are described in a case of the 2-holder type tool stand 200*b* according to the present embodiment.

Figure 9:
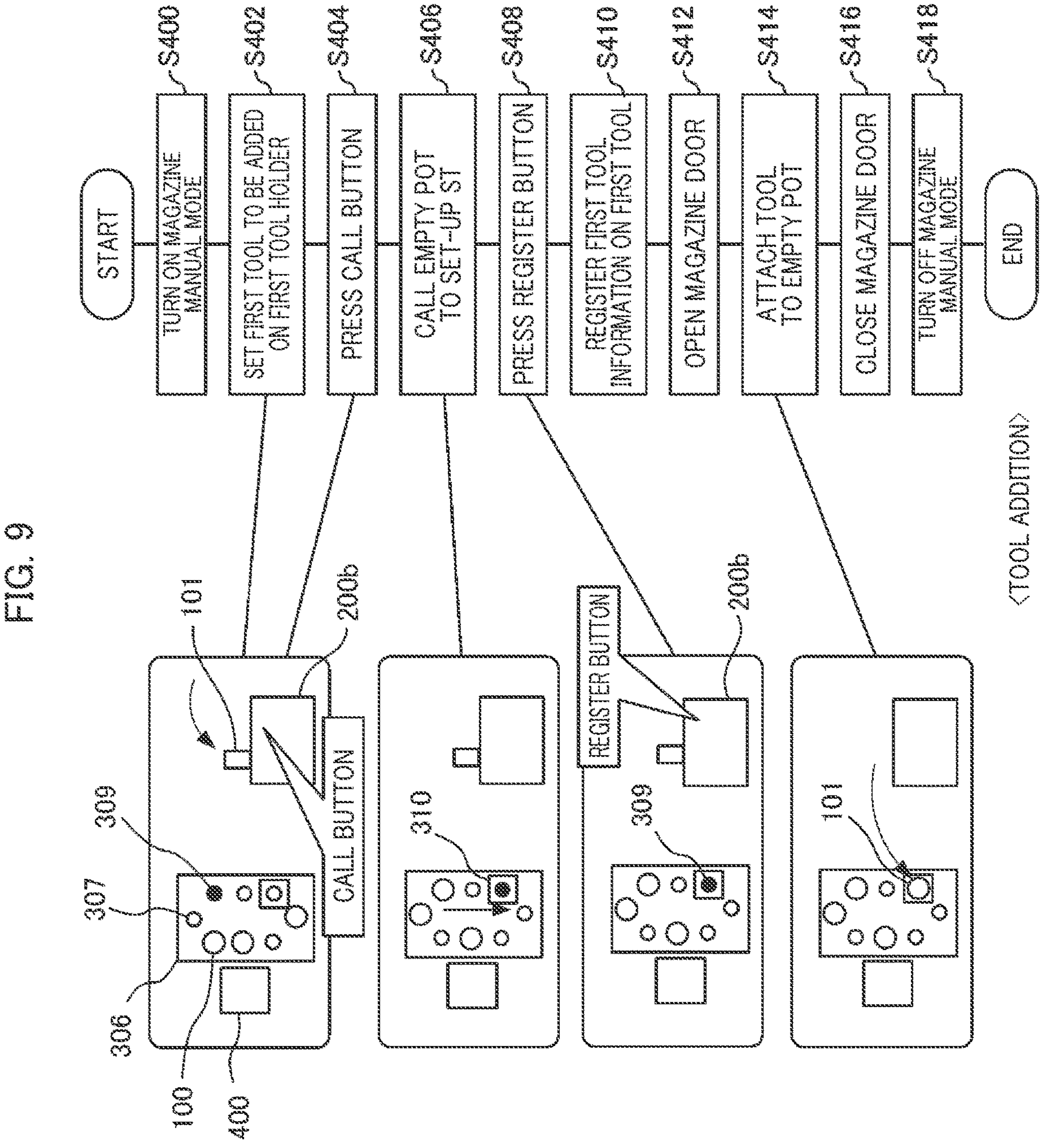
FIG. 9 is a flowchart of works and operations when the tool is attached using the 2-holder type tool stand (in tool addition)

FIG. 9 is a flowchart of works and operations when the tool 100 is attached using the 2-holder type tool stand 200*b* (in tool addition).

A worker operates the magazine operation panel 400 to turn on a magazine manual mode (S400). The worker sets a tool to be added (hereinafter, a "first tool 101") on the first tool holder 262 (S402). The worker presses the call button 212 (S404). With this operation, the empty pot 309 is called to the set-up station 310 (S406).

More specifically, when the accepting portion 210 of the tool stand 200*b* accepts a pot call instruction, the first tool-tag reader 264 reads tool information (hereinafter, "first tool information") from the IC tag 120 of the first tool 101 set on the first tool holder 262. The transmitter 230 of the tool stand 200*b* transmits the pot call instruction including the read first tool information to the PLC 320. Upon receiving the pot call instruction including the first tool information, the PLC 320 transmits it to the machine-tool operation panel 500. Alternatively, the transmitter 230 of the tool stand 200*b* may transmit the pot call instruction including the first tool information directly to the machine-tool operation panel 500.

The receiver 532 of the machine-tool operation panel 500 receives the pot call instruction including the first tool information. The controller 540 of the machine-tool operation panel 500 determines whether the tool 100 of the same model as the first tool 101 set on the first tool holder 262 is accommodated in the tool magazine 306. When the tool 100 of the same model as the first tool 101 set on the first tool holder 262 is not accommodated in the tool magazine 306, the first tool 101 set on the first tool holder 262 is newly added to the tool magazine 306. More specifically, the controller 540 of the machine-tool operation panel 500 reads out a tool name from the first tool information included in the received pot call instruction. The controller 540 of the machine-tool operation panel 500 searches the tool information storage portion 504 for tool information including the same tool name as the read tool name. When there is no tool information including the same tool name, the controller 540 of the machine-tool operation panel 500 determines that the tool 100 of the same model as the first tool 101 set on the first tool holder 262 is not accommodated in the tool magazine 306. It is assumed here that the tool 100 of the same model as the first tool 101 is not accommodated.

When tool information on the tool 100 of the same model as the first tool 101 is not registered, a pot that can accommodate the tool 100 set on the first tool holder 262 is identified. For example, a pot satisfying the following three conditions is found.

(1) The pot looked for is an empty pot for which information indicating no tool is stored to correspond to its pot number.

(2) The diameter of the first tool 101 is smaller than the maximum diameter of the pot looked for, and the length of the first tool 101 is smaller than the maximum length of the pot looked for.

(3) The first tool 101 does not interfere with the tool 100 accommodated in a pot adjacent to the empty pot. A conventional technique may be applied to a method for determining whether interference between tools occurs.

The transmitter 230 of the machine-tool operation panel 500 transmits the pot call instruction including the pot number of the identified pot to the PLC 320. Upon receiving the pot call instruction including the pot number, the PLC 320 transmits it to the tool magazine 306. Alternatively, the transmitter 230 of the tool stand 200*b* may transmit the pot call instruction including the pot number directly to the tool magazine 306. Upon receiving the pot call instruction including the pot number, the tool magazine 306 moves the empty pot 309 identified by that pot number to the set-up station 310.

The worker presses the register button 214 (S408). With this operation, first tool information on the first tool 101 to be added is registered in the tool information storage portion 504 of the machine-tool operation panel 500 (S410).

More specifically, when the accepting portion 210 of the tool stand 200*b* accepts a registration instruction, the first tool-tag reader 264 reads the first tool information from the IC tag 120 of the first tool 101 set on the first tool holder 262. In this manner, the accepting portion 210 of the tool stand 200*b* accepts an instruction to read the first tool information on the first tool 101 placed on the first tool holder 262 (the registration instruction). The transmitter 230 of the tool stand 200*b* transmits the registration instruction including the read first tool information to the PLC 320. Upon receiving the registration instruction including the first tool information, the PLC 320 transmits it to the machine-tool operation panel 500. Alternatively, the transmitter 230 of the tool stand 200*b* may transmit the registration instruction including the first tool information directly to the machine-tool operation panel 500.

The receiver 532 of the machine-tool operation panel 500 receives the registration instruction including the first tool information. The controller 540 of the machine-tool operation panel 500 stores the first tool information on the first tool 101 included in the registration instruction in the tool information storage portion 504 in such a manner that the first tool information corresponds to the pot number of the empty pot 309 moved to the set-up station 310. As described above, the transmitter 230 of the tool stand 200*b* transmits the first tool information on the first tool 101 placed on the first tool holder 262 to the tool information storage portion 504 storing therein tool information, when that first tool information is read.

The worker opens the magazine door (S412). The worker attaches the first tool 101 to the empty pot 309 (S414). The worker closes the magazine door (S416). The worker operates the magazine operation panel 400 to turn off the magazine manual mode (S418).

Figure 10:
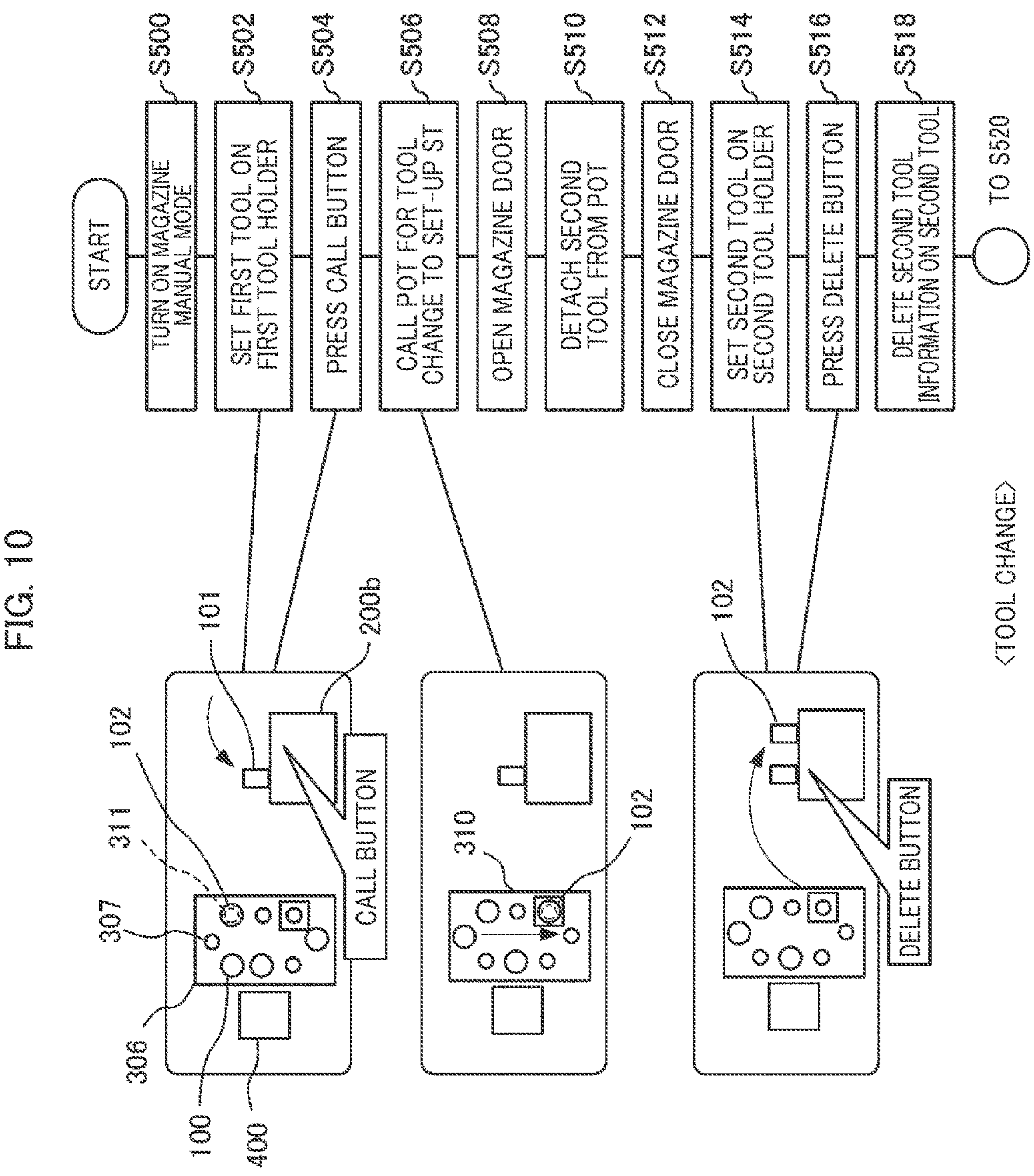
FIG. 10 is a flowchart of works and operations when the tool is changed using the 2-holder type tool stand (in tool change)
Figure 11:
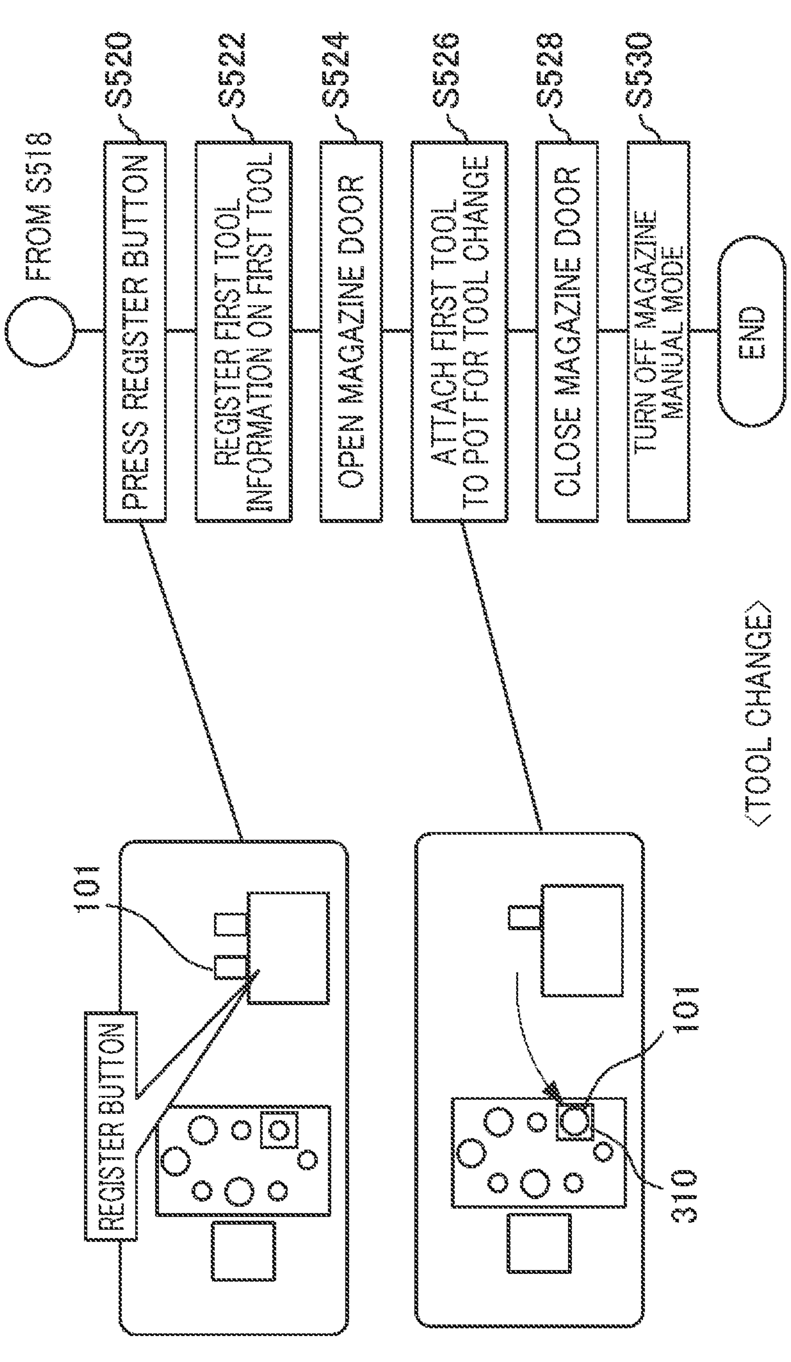
FIG. 11 is a flowchart of works and operations when the tool is changed using the 2-holder type tool stand (in tool change)

FIGS. 10 and 11 are flowcharts of works and operations when the tool 100 is changed using the 2-holder type tool stand 200*b* (in tool change).

A worker operates the magazine operation panel 400 to turn on a magazine manual mode (S500). The worker sets the first tool 101 (a new tool) on the first tool holder 262 (S502). The worker presses the call button 212 (S504). With this operation, the pot 311 for tool change is called to the set-up station 310 (S506).

More specifically, when the accepting portion 210 of the tool stand 200*b* accepts a pot call instruction, the first tool-tag reader 264 reads first tool information from the IC tag 120 of the first tool 101 set on the first tool holder 262. The transmitter 230 of the tool stand 200*b* transmits the pot call instruction including the read first tool information to the PLC 320. Upon receiving the pot call instruction including the first tool information, the PLC 320 transmits it to the machine-tool operation panel 500. Alternatively, the transmitter 230 of the tool stand 200*b* may transmit the pot call instruction including the first tool information directly to the machine-tool operation panel 500.

The receiver 532 of the machine-tool operation panel 500 receives the pot call instruction including the first tool information. The controller 540 of the machine-tool operation panel 500 determines whether the tool 100 of the same model as the first tool 101 set on the first tool holder 262 is accommodated in the tool magazine 306. When the tool 100 of the same model as the first tool 101 set on the first tool holder 262 is accommodated in the tool magazine 306, the tool 100 of the same model that already exists in the tool magazine 306 is changed with the first tool 101 set on the first tool holder 262. The controller 540 of the machine-tool operation panel 500 reads out a tool name from the first tool information included in the received pot call instruction. The controller 540 of the machine-tool operation panel 500 searches the tool information storage portion 504 for tool information including the same tool name as the read first tool name. When there is tool information including the same tool name, the controller 540 of the machine-tool operation panel 500 determines that tool information on the tool 100 of the same model as the first tool 101 set on the first tool holder 262 has been registered. It is assumed here that the tool 100 of the same model as the first tool 101 has been accommodated in the tool magazine 306.

When the tool information on the tool 100 of the same model as the first tool 101 has been registered, the controller 540 of the machine-tool operation panel 500 identifies the pot number corresponding to that tool information. In FIG. 10, the pot 311 for tool change illustrated with a broken-line circle corresponds to that pot number. That is, a used tool (hereinafter, a "second tool 102") of the same model as the first tool 101 is fitted in the pot 311 for tool change.

The transmitter 230 of the machine-tool operation panel 500 transmits a pot call instruction including the identified pot number of the pot 311 to the PLC 320. Upon receiving the pot call instruction including the pot number of the pot 311, the PLC 320 transmits it to the tool magazine 306. Alternatively, the transmitter 230 of the tool stand 200*b* may transmit the pot call instruction including the pot number of the pot 311 directly to the tool magazine 306. Upon receiving the pot call instruction including the pot number of the pot 311 for tool change, the tool magazine 306 moves the pot 311 for tool change to the set-up station.

The worker opens the magazine door (S508). The worker detaches the used second tool 102 from the pot 311 (S510). The worker closes the magazine door (S512). The worker sets the detached second tool 102 on the second tool holder 272 (S514). The worker presses the delete button 216 (S516). With this operation, second tool information on the second tool 102 registered in the tool information storage portion 504 of the machine-tool operation panel 500 is deleted (S518).

More specifically, when the accepting portion 210 of the tool stand 200*b* accepts a delete instruction, the second tool-tag reader 274 reads the second tool information from the IC tag 120 of the second tool 102 set on the second tool holder 272. In this manner, the accepting portion 210 of the tool stand 200*b* accepts an instruction to read the second tool information on the second tool 102 placed on the second tool holder 272 (the delete instruction). The transmitter 230 of the tool stand 200*b* transmits the delete instruction including the read second tool information to the PLC 320. Upon receiving the delete instruction including the second tool information, the PLC 320 transmits it to the machine-tool operation panel 500. Alternatively, the transmitter 230 of the tool stand 200*b* may transmit the delete instruction including the second tool information directly to the machine-tool operation panel 500. As described above, when the second tool information on the second tool 102 placed on the second tool holder 272 has been read, the transmitter 230 of the tool stand 200*b* transmits an instruction to delete the second tool information.

The receiver 532 of the machine-tool operation panel 500 receives the delete instruction including the second tool information. The controller 540 of the machine-tool operation panel 500 searches the tool information storage portion 504 for tool information that is the same as the second tool information included in the delete instruction. Since tool information can be identified by a tool ID, the controller 540 of the machine-tool operation panel 500 may read out a tool ID from the second tool information and search for tool information including the same tool ID as the read tool ID. The controller 540 of the machine-tool operation panel 500 deletes the second tool information stored in the tool information storage portion 504 and stores information indicating no tool instead.

FIG. 11 is described next. The worker presses the register button 214 (S520). With this operation, the first tool information on the first tool 101 is registered in the tool information storage portion 504 of the machine-tool operation panel 500 (S522). A process of registering the first tool information on the first tool 101 is identical to the process at S410 in FIG. 9. The accepting portion 210 of the tool stand 200*b* accepts an instruction to read the first tool information on the first tool 101 placed on the first tool holder 262 (the registration instruction), as in the case of S410 in FIG. 9. Further, the transmitter 230 of the tool stand 200*b* transmits the first tool information on the first tool 101 placed on the first tool holder 262 to the tool information storage portion 504 storing therein tool information, when that first tool information has been read.

Subsequently, the worker opens the magazine door (S524). The worker attaches the first tool 101 to the pot 311 (S526). The worker closes the magazine door (S528). The worker operates the magazine operation panel 400 to turn off the magazine manual mode (S530).

FIG. 12 is a flowchart of works and operations when the tool 100 is detached using the 2-holder type tool stand 200*b* (in tool removal).

A worker operates the magazine operation panel 400 to turn on a magazine manual mode (S600). The worker operates the magazine operation panel 400 to select the pot 312 of the second tool 102 to be removed (S602). With this operation, the pot 312 of the second tool 102 to be removed is called to the set-up station 310 (S604).

More specifically, the accepting portion 410 of the magazine operation panel 400 accepts a pot call instruction including the pot number of the selected pot 312. The transmitter 430 of the magazine operation panel 400 transmits the pot call instruction including the pot number of the pot 312 to the PLC 320. Upon receiving the pot call instruction including the pot number of the pot 312, the PLC 320 transmits it to the tool magazine 306. Alternatively, the transmitter 430 of the magazine operation panel 400 may transmit the pot call instruction including the pot number of the pot 312 directly to the tool magazine 306. Upon receiving the pot call instruction including the pot number of the pot 312, the tool magazine 306 moves the pot 312 to the set-up station.

The worker opens the magazine door (S606). The worker detaches the second tool 102 to be removed, from the pot 312 (S608). The worker closes the magazine door (S610). The worker sets the second tool 102 to be removed on the second tool holder 272 (S612). The worker presses the delete button 216 (S614).

With this operation, second tool information on the second tool 102 registered in the tool information storage portion 504 of the machine-tool operation panel 500 is deleted (S616). A process of deleting the second tool information on the second tool 102 is identical to the process at S518 in FIG. 10. The accepting portion 210 of the tool stand 200*b* accepts an instruction to read the second tool information on the second tool 102 placed on the second tool holder 272 (the delete instruction), as in the case of S518 in FIG. 10. Further, when the second tool information on the second tool 102 placed on the second tool holder 272 has been read, the transmitter 230 of the tool stand 200*b* transmits an instruction to delete the second tool information.

The worker temporarily places a tool on the tool cart 600 (S618). The worker operates the magazine operation panel 400 to turn off the magazine manual mode (S620).

[First Modification]

When the call button 212 is pressed at S404 in FIG. 9, the process of calling the empty pot 309 (S406) may be followed by the process of registering tool information on the tool 100 described at S410. In this case, the operation of pressing the register button at S408 in FIG. 9 can be omitted, so that the operations can be simplified.

Similarly, when the call button is pressed at S504 in FIG. 10, the process of calling the pot 311 for tool change (S506) may be followed by the process of registering tool information on the first tool 101 described at S522 in FIG. 11. In this case, the operation of pressing the register button at S520 in FIG. 11 can be omitted, so that the operations can be simplified.

[Second Modification]

Although an example of using an IC tag has been described as means for sending information from the tool 100 to the tool stand 200*a*, the tool information may be sent in another way. An RFID tag other than an IC tag may be used. The tool information may be transferred from the tool 100 to the tool stand 200*a* by near field communication means other than the IC tag. In this case, the tool 100 includes a transmitter that transmits the tool information, and the tool stand 200*a* includes a receiver that receives the tool information. The tool information may be transferred by a contact method other than the contactless method described above. The tool 100 may be provided with a storage portion for storing therein tool information and a first connector connected to the storage portion, the tool stand 200*a* may be provided with a second connector that can be coupled to the first connector, and the tool information may be read from the storage portion via the first and second connectors by means of a reader of the tool stand 200*a* when the tool 100 is set on the tool holder 202 to couple the first and second connectors to each other. As one example, the tool 100 may be provided with a USB (Universal Serial Bus) memory that stores therein tool information, and the tool stand 200*a* may be provided with a USB connector. The USB connector of the tool stand 200*a* is provided at a position at which it engages with a connector of the USB memory of the tool 100 when the tool 100 is set in the tool holder 202. That is, tool information may be transferred from the tool 100 to the tool stand 200*a* by wired communication means. Graphic codes such as barcodes, QR codes (registered trademark), or AprilTag may be used. A graphic code representing tool information may be provided to the tool 100, and the tool information may be acquired by reading the graphic code with a graphic-code reader of the tool stand 200*a*. The relation between the first tool 101 and the first tool holder 262 and the relation between the second tool 102 and the second tool holder 272 in the tool stand 200*b* can be modified in the manner described above.

The present invention is not limited to the embodiment described above and modifications thereof, and any component thereof can be modified and embodied without departing from the scope of the invention. Components described in the embodiments and modifications can be combined as appropriate to form various embodiments. Some components may be omitted from the components presented in the embodiments and modifications.

This application claims priority to Japanese Patent Application No. 2022-020152 filed on Feb. 14, 2022, which is incorporated herein by reference in its entirety.

What is claimed is:

1. A tool stand communicably connected to a machine tool including a storage portion for storing tool information on tools accommodated in a tool magazine, the tool stand comprising:

- a tool holder for allowing a tool to be placed thereon, the tool to be added to a tool magazine;
- a call button for accepting a pot call instruction to call a pot in the tool magazine;
- a reader for reading tool information from the tool placed on the tool holder;
- a register button for accepting a registration instruction to register the tool information; and
- a transmitter for transmitting signals of various information to the machine tool, wherein (i) when the call button accepts the pot call instruction, the transmitter transmits a signal of the pot call instruction to the machine tool, and (ii) when the register button accepts the registration instruction in a state where the tool to be added is placed on the tool holder, the reader reads the tool information from the tool to be added, and the transmitter transmits a signal of the registration instruction including the read tool information to the machine tool.

2. A tool stand communicably connected to a machine tool including a storage portion for storing therein tool information on tools accommodated in a tool magazine, the tool stand comprising:

a call button for accepting a pot call instruction to call a pot in a tool magazine;

a transmitter for transmitting signals of various information to the machine tool;

a tool holder for allowing a tool to be placed thereon, the tool having been detached from the tool magazine;

a reader for reading tool information from the tool placed on the tool holder; and a delete button for accepting a delete instruction to delete the tool information, wherein (i) when the call button accepts the pot call instruction, the transmitter transmits a signal of the pot call instruction to the machine tool, and (ii) when the delete button accepts the delete instruction in a state where the tool having been detached is placed on the tool holder, the reader reads the tool information from the tool having been detached, and the transmitter transmits a signal of the delete instruction including the read tool information to the machine tool.

* * * * *